United States Patent
Martin

(10) Patent No.: US 11,000,925 B2
(45) Date of Patent: May 11, 2021

(54) METHOD OF FORMING COOLING HOLES

(71) Applicant: United Technologies Corporation, Farmington, CT (US)

(72) Inventor: Thomas J. Martin, East Hampton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 223 days.

(21) Appl. No.: 16/138,328

(22) Filed: Sep. 21, 2018

(65) Prior Publication Data

US 2020/0094357 A1    Mar. 26, 2020

(51) Int. Cl.
| | |
|---|---|
| *B23P 15/02* | (2006.01) |
| *B22C 9/24* | (2006.01) |
| *B22D 25/02* | (2006.01) |
| *G05B 19/4097* | (2006.01) |
| *F01D 5/18* | (2006.01) |

(52) U.S. Cl.
CPC .......... *B23P 15/02* (2013.01); *B22C 9/24* (2013.01); *B22D 25/02* (2013.01); *G05B 19/4097* (2013.01); *F01D 5/186* (2013.01); *F05D 2230/12* (2013.01); *F05D 2230/13* (2013.01); *F05D 2230/211* (2013.01); *G05B 2219/35134* (2013.01)

(58) Field of Classification Search
CPC .......... F01D 5/186; B23P 2700/06; Y10T 296/49341; F05D 2260/202; B23B 39/26; B23B 35/00
See application file for complete search history.

(56) References Cited

U.S. PATENT DOCUMENTS

| | | | | |
|---|---|---|---|---|
| 3,239,941 A | * | 3/1966 | Ahmer ............... | B25D 5/00 33/679 |
| 5,216,808 A | * | 6/1993 | Martus .............. | B23K 26/032 29/889.1 |
| 5,418,345 A | * | 5/1995 | Adamski ........... | B23H 9/10 219/121.71 |
| 6,380,512 B1 | * | 4/2002 | Emer ................. | B23K 26/04 219/121.71 |
| 6,524,395 B1 | * | 2/2003 | Devine, II ........ | B08B 3/02 134/18 |
| 6,701,615 B2 | * | 3/2004 | Harding ............ | B23P 6/002 29/402.07 |

(Continued)

FOREIGN PATENT DOCUMENTS

| | | |
|---|---|---|
| EP | 0943916 A2 | 9/1999 |
| EP | 1813365 A1 | 8/2007 |

(Continued)

OTHER PUBLICATIONS

Extended European Search Report for EP Application No. 19198762.7, dated Feb. 24, 2020, pp. 9.

*Primary Examiner* — Jason L Vaughan
(74) *Attorney, Agent, or Firm* — Kinney & Lange, P.A.

(57) ABSTRACT

A method of forming a film cooling hole in a component having an internal surface and an external surface is disclosed herein that includes forming the component with a first feature on the external surface, measuring a geometry of the external surface to determine a first placement of the first feature, and drilling the film cooling hole through the component at the first placement.

14 Claims, 2 Drawing Sheets

(56) References Cited

U.S. PATENT DOCUMENTS

| | | | | |
|---|---|---|---|---|
| 6,723,951 | B1* | 4/2004 | McGraw | B23K 26/04 |
| | | | | 219/121.71 |
| 7,841,083 | B2 | 11/2010 | Alaux et al. | |
| 8,578,581 | B2* | 11/2013 | Bellerose | G05B 19/402 |
| | | | | 29/407.09 |
| 8,707,713 | B2* | 4/2014 | Levasseur | F01D 5/186 |
| | | | | 60/752 |
| 8,807,885 | B2* | 8/2014 | Herbold | B23B 41/00 |
| | | | | 408/1 R |
| 9,250,188 | B2* | 2/2016 | Tallman | G01N 21/84 |
| 9,273,560 | B2* | 3/2016 | Gleiner | F01D 5/187 |
| 9,403,245 | B2* | 8/2016 | Arjakine | F01D 5/005 |
| 9,702,817 | B2* | 7/2017 | Worth | G01N 21/53 |
| 9,707,645 | B2* | 7/2017 | Ozturk | B23P 6/002 |
| 10,048,133 | B2* | 8/2018 | Smith | G01J 5/061 |
| 10,132,167 | B2* | 11/2018 | Rizzo, Jr. | F01D 5/186 |
| 2012/0167389 | A1* | 7/2012 | Lacy | B23P 6/002 |
| | | | | 29/889.1 |
| 2015/0107341 | A1 | 4/2015 | Reid et al. | |
| 2015/0122998 | A1 | 5/2015 | Koonankeil | |
| 2016/0160655 | A1 | 6/2016 | O'Connor et al. | |
| 2016/0298462 | A1 | 10/2016 | Thornton et al. | |

FOREIGN PATENT DOCUMENTS

| | | | |
|---|---|---|---|
| EP | 2093641 | A1 | 8/2009 |
| EP | 2428795 | A1 | 3/2012 |
| EP | 3106617 | A1 | 12/2016 |

* cited by examiner

METHOD OF FORMING COOLING HOLES

FIELD OF THE INVENTION

The present invention relates to the formation of holes and, in particular, to an improved method of forming cooling holes with complex geometries.

BACKGROUND

In components subject to high temperatures, such as components in a gas turbine engine, cooling holes may be necessary to provide cooling air to various surfaces. The effectiveness of the cooling holes depends on the amount, placement, and shape of the holes. The amount, placement, and shape of the holes have grown in complexity. A number of methods of forming the holes are utilized, each with their own drawbacks. The holes can be drilled with a laser or conventional drill. However, the shape of the hole is limited to a round cross-sectional shape. Electric discharge machining ("EDM") can be used, but hole shape is limited to the plunge volume of the tool, and EDM can only be used for components that are electrically conductive. The cooling holes can be cast into the component during manufacture of the component, which allows for complex geometries. However, the cast-in process utilizes additional components (a core insert as well as an outer shell) and is labor intensive and expensive because of the need to create the core insert and shell.

A method combining drilling (whether EDM, laser, or another type of drilling) with the cast-in process is less expensive than utilizing only the cast-in process and also allows for complex geometries of the cooling holes. That method includes casting features into the component on one or both sides with these features forming a shaped inlet or outlet of the cooling hole. Then, the cooling holes are drilled (using a laser, conventional drill, EDM or another system/machine) through the component between corresponding features to form a shaped cooling hole. However, drilling the holes to connect the corresponding features is difficult because the holes are often drilled at an angle and the component is usually small and opaque so viewing the features on both sides of the component simultaneously is not possible.

SUMMARY

A method of forming a film cooling hole in a component having an internal surface and an external surface is disclosed. The method includes forming the component with a first feature on the external surface, measuring a geometry of the external surface to determine a first placement of the first feature, and drilling the film cooling hole through the component at the first placement. The method can also include forming a second feature on an internal surface of the component, measuring the geometry of the internal surface to determine a second placement of the second feature, and drilling the cooling hole through the component between the first placement and the second placement.

Another method of forming a hole is a component with improved accuracy includes casting the component with the component having at least one external feature on an external surface, determining a first placement of the at least one external feature, and forming the hole through the component at the first placement. The external feature can be an indentation with the first placement being at a location of maximum depth of the external feature such that a hole is formed with a complex geometry adjacent the external surface.

DETAILED DESCRIPTION

The disclosed improved process for forming a cooling hole in a component subject to high temperatures, such as an airfoil in a gas turbine engine, allows for more accurate drilling of the cooling hole while still allowing for the cooling hole to have complex geometries. The process includes using various methods to measure geometries of the surfaces of the component to determine the placements of the cast-in features and then using that information to drill more accurate cooling holes.

In this disclosure, the two sides of the component are described as being an internal surface and an external surface, which can be an internal surface of an airfoil adjacent internal cooling structures and an external surface of the airfoil adjacent airflow. However, the internal surface does not need to be on an internal side and the external surface does not need to be on an external side of the component.

Flash thermography and an infrared camera can be used to measure the geometry of the internal surface to determine the placements/locations of the cast-in internal features. First, flash thermography provides thermal energy to heat the external surface such that enough heat is transmitted through the component to the internal surface. The thermal energy source is then removed and the infrared camera then monitors the external surface as the component cools. The time variation in surface temperature is dependent upon the material properties and the external and internal geometry of the component (e.g., thickness). Thus, any internal thermal boundaries (e.g., walls, cavities, voids, protrusions, indentations, etc.) are visible by the infrared camera and their position can be known accurately relative to the external surface. To measure the geometry of the external surface, a structured light scanner (which can use white, blue, or another colored light) and/or coordinate measurement machines can be utilized to measure any changes in elevation (i.e., the cast-in features of the cooling holes) on the external surface. The placements of the internal and external cooling hole features can be mapped to a computer model of the component to determine the corresponding cooling hole locations and features, which can then be referred to when determining a start and end position of the cooling holes to improve positional accuracy of the drilling of the cooling holes. The cooling capabilities of the cooling holes are increased with improved accuracy and complex hole geometries, which in turn increases the cooling efficiency.

Figure 1:
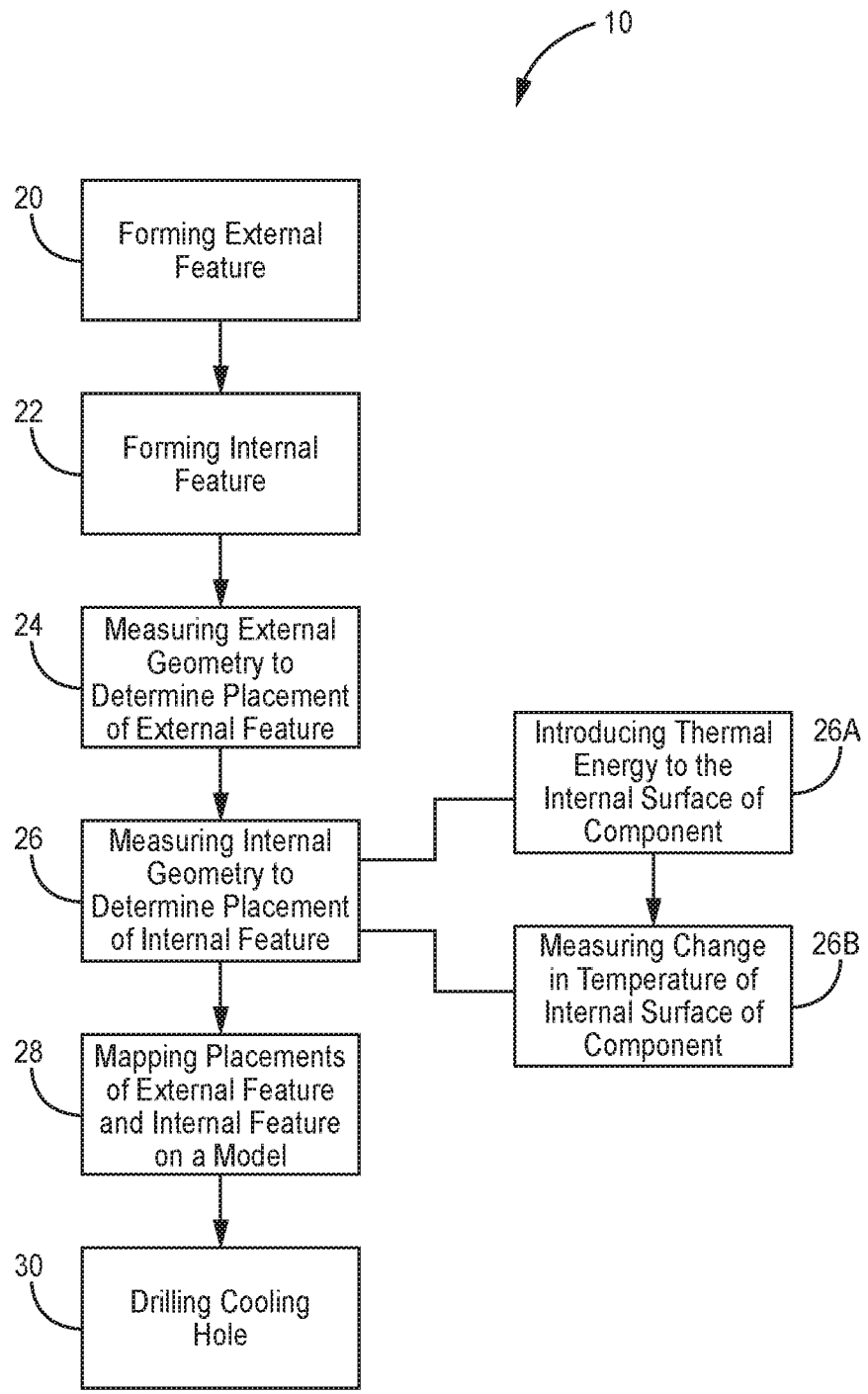
FIG. 1 is a flow chart of a process for precision forming a cooling hole with complex geometries.

FIG. 1 is a flow chart of process 10 for forming a cooling hole with improved accuracy and complex geometries. The steps of process 10 do not need to be performed in the order described herein, some steps may be omitted, and additional steps can be performed during process 10 without straying outside the scope of this invention. Additionally, while described with regards to one cooling hole, process 10 can be performed simultaneously with multiple cooling holes on the component or multiple components. Further, the component can have any shape, orientation, or configuration and is merely described herein as an apparatus through which the cooling hole extends. For example, the component can be a turbine blade, turbine vane, blade outer air seal, combustor panel, nozzle panel, turbine exhaust case, heat shield, or another apparatus. In addition, while the holes in this disclosure are described as cooling holes suitable for conveying cooling air through the component, process 10 can be utilized to form (and improve accuracy of) any type of hole/protrusion through an apparatus. The steps of process 10 are set out in FIG. 1 and described in greater detail below.

First, process 10 includes step 20, which is forming the component with at least one external feature. The component can be formed through various manufacturing methods, such as molding/casting. However, the manufacturing method should be selected such that the component includes one or a number of external features on an outside/external surface of the component. The external features can be complex geometries, such as indentations, grooves, trenches, dimples, bumps, multiple lobes (e.g., multidirectional grooves/indentations), or other features for directing/transitioning the flow of cooling air/gas either into the cooling hole or outward from the cooling hole. For example, the external feature can be one or multiple lobes that direct the cooling air to form a film cooling arrangement across the external surface of the component. The external feature can be cast into the component by using a mold or another configuration.

Second, process 10 includes step 22, which is similar to step 20 in that the component is formed having at least one internal feature. Step 22 can take place simultaneously with step 20. Like the external features, the internal features can be complex geometries, such as indentations, grooves, trenches, dimples, bumps, multiple lobes (e.g., multidirectional grooves/indentations), or other features for directing/transitioning the flow of cooling air/gas either into the cooling hole or outward from the cooling hole. For example, the internal feature can be a fillet that directs/transitions cooling air/gas from an inner portion of the component into the cooling hole (once the cooling hole is drilled into the component and the component is in operation).

Step 24 is measuring an external geometry of the component to determine a placement of the external feature. This step can be performed using an optical or tactile imaging system, a high resolution video/photograph camera, a structured light scanner, a tactical probe, a coordinate measurement machine, or another system/tool. Because the external feature may be small and difficult to view with the naked eye, systems and/or tools may be utilized to determine the placement of the external feature. Step 24 can also utilize thermography as described below with regards to step 26 After the external geometry of the component is measured to determine the placement of the external feature, the placement can be marked either physically on the component or, as set out in step 28 below, on a physical or computer model of the component, which is then referred to when performing step 30 (drilling the cooling hole) to ensure the cooling hole and external feature line up as designed.

Next, step 26 is performed, which includes measuring an internal geometry of the component to determine a placement of the internal feature. Step 26 can be performed before, during, or after step 24 or not at all if no internal feature exists. Step 26 can be performed using any of the systems/tools utilized to perform step 24 (measuring external geometry). Further, step 26 can be performed using any type of thermography; such as pulse, flash, or echo thermography; coupled with an infrared camera or another thermal imaging machine to measure the internal geometry of the component. Using thermography may be advantageous because the internal surface, and therefore the internal features, may not be easily viewable if the component is configured such that the internal surface is enclosed (e.g., a turbine blade/vane). Thermography can accurately measure a thickness of the component to identify the placement of the internal feature, which is a feature that either decreases or increases the thickness of the component through indentations, ridges, trenches, etc. in the inner surface. Any tool/machine utilized to determine the placements of the external feature and internal feature should be nondestructive so as to not damage or otherwise alter the component.

Performing step 26 using thermography includes substep 26A, which is introducing thermal energy to the internal surface of the component. The thermal energy can be introduced at various intensities at for any duration, including a brief pulse (or multiple pulses) or extended period. The thermal energy can come from a variety of sources; such as a heat lamp, laser, or another apparatus; located any distance away from the internal surface. The thermal energy introduced to the internal surface of the component during step 26A should raise the temperature of the component so that substep 26B can be performed.

Substep 26B includes measuring a change in temperature of the internal surface of the component to determine the thickness distribution of the component, or thickness distributions of multiple layers of a composite component, (and therefore the placement of the internal features). Alternatively, a change in temperature of the external surface can be measured with the same analysis set out below performed to determine the thickness distribution of the component. Substep 26B can be performed using an infrared camera or another thermal imaging machine. The change in temperature over time (i.e., how quickly the component cools) at each location along the component is proportionally related to the thickness of the component with the thickness of the component being increased or decreased at the placement of the internal feature. Thus, by measuring the change in temperature of the internal surface/component at each location along the component, the placement of the internal feature is determined. The thermal imaging machine (e.g., infrared camera) monitors the component to measure a surface temperature over time (which can be the external surface temperature because the external surface temperature at a location can be proportional to the internal surface temperature at that location). The temperature of the component depends upon the component geometry—not just where the internal feature is located, but also the component material and any coating thickness—as well as material properties (e.g., thermal conductivity), surface emittance and reflectivity, and environmental conditions (e.g., external air temperature, external and/or internal air flow, humidity, and/or background thermal radiation). Any internal topographies/inconsistences (e.g., walls, cavities, voids, changes in materials, indentations, etc.) alter a temperature response at that location. The altered temperature response (i.e., how slowly/quickly the component cools) at the location is detected by the thermal imaging machine, and the size of an area of altered temperature response, a depth, and a change in thermal properties in the surrounding area can be deduced from a comparison of the altered temperature response with a baseline temperature response for a given component thickness, material, etc.

Figure 2:
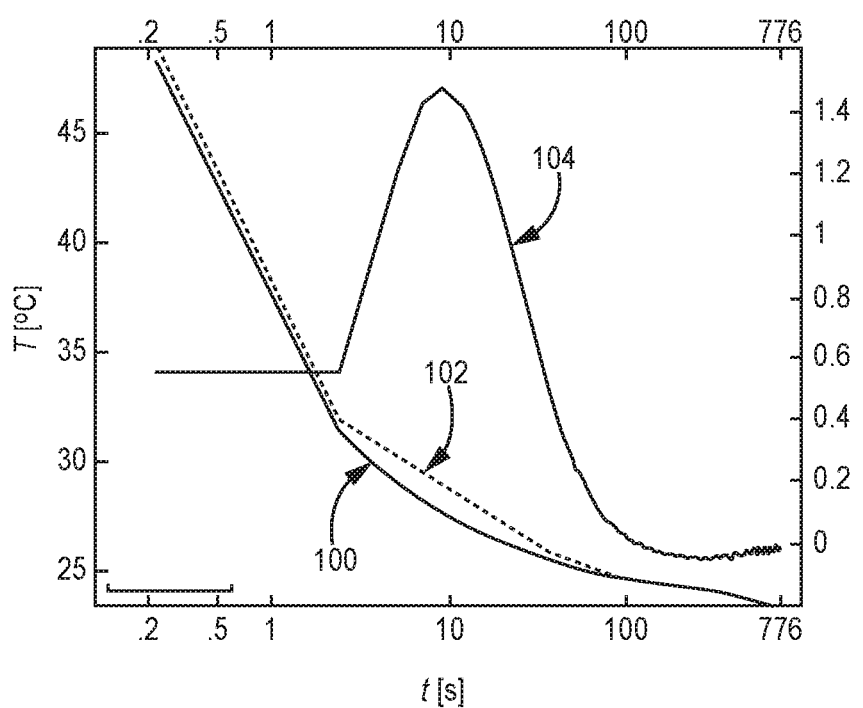
FIG. 2 is an exemplary graph of temperature response versus time.

For example, the temperature response during component cooling (i.e., temperature of the component vs. the time) for a given component thickness and known material is plotted in FIG. 2 as solid line 100. The altered temperature response at a placement of an internal feature is plotted as dotted line 102. If no internal feature is present, line 100 and line 102 should be identical because all variables, including component thickness, are the same. Thus, the placement of the internal feature is determined to be at the location on the component that the altered temperature profile is found. To aid detection of the differences between line 100 and line 102, the differences can be put on a log scale, which is shown in FIG. 2 as line 104. Using thermography in step 26 allows for easy measurement of the internal geometry of the internal surface of the component and determination of the placement of the internal feature. Thermography is quick and does not damage the component. While step 26 is described herein as utilizing thermography with a thermal imaging machine (such as an infrared camera) to determine the placement of the internal feature, other systems and methods can be used.

The baseline (line 100 in FIG. 2) can be determined through physical testing of the component or through computer modeling to establish an inverse algorithm. The inverse algorithm uses a thermal simulation to predict the temperature response in the component subject to known external thermal energy. The inverse algorithm can factor in other variables, such as whether the component is internally cooled during step 24 (such as by cooling air flow) and the heat transfer coefficient distribution on the internal surface of the component.

Once the placement of the external feature and placement of the internal feature are determined through step 24 and step 26, respectively, the placements of those features can be mapped onto the component itself or onto a physical or computer model of the component (step 28). The computer model of the component can be a solid model, geometry model, computer-aided design model, computer-aided engineering model, or another type of model. The placements on the component itself or on the model (whether physical or digital) can then be referred to when performing step 30 to ensure the placement and angle of the drilling of the cooling hole is correct and extremely accurate.

Finally, step 30 is performed by drilling the cooling hole through the component between the placement of the external feature and the placement of the internal feature. Step 28 can be performed by various means, including laser drilling, electric discharge machining, or other physical and/or chemical means necessary to produce the desired shape. The cooling hole can be drilled at an angle, can be arced, or can have another configuration as the cooling hole extends through the component. Additionally, the cooling hole can have any size and cross-sectional shape. By casting the external features and internal features, complex geometries can be formed on the external surface and internal surface of the component. By drilling the cooling hole to connect the external feature and internal feature instead of casting the cooling hole through the component, complex geometries can still be achieved without the need for the expensive core insert and/or shell that must be utilized if the cooling hole were to be entirely formed during the casting process.

Because the exact location of the external feature and internal feature are known, step 30 can be very accurate and avoids drilling the cooling hole distant from the external feature and/or internal feature, drilling the cooling hole at an incorrect angle, or incompletely drilling the cooling hole such that the cooling hole does not extend completely through the component. Thus, process 10 forms a cooling hole that is both a complex geometry and is accurately located to meet the desired design. This ability for complex geometries and accurate placement increases the efficiency of the cool hole, thereby increasing the durability of the component. Further, because the cast-in process does not need to be utilized to form the entire cooling hole, core inserts and shells that are expensive and time consuming are avoided.

Discussion of Possible Embodiments

The following are non-exclusive descriptions of possible embodiments of the present invention.

A method of forming a film cooling hole in a component having an internal surface and an external surface is disclosed. The method includes forming the component with a first feature on the external surface, measuring a geometry of the external surface to determine a first placement of the first feature, and drilling the film cooling hole through the component at the first placement. The method can also include forming a second feature on an internal surface of the component, measuring the geometry of the internal surface to determine a second placement of the second feature, and drilling the cooling hole through the component between the first placement and the second placement.

The method of forming a film cooling hole of the preceding paragraph can optionally include, additionally and/or alternatively, any one or more of the following features, configurations, steps, and/or additional components:

The first feature is an indentation and the first placement is at a location of maximum depth of the first feature.

The measurement of the geometry of the external surface is performed using a structured light scanner.

The step of measuring the geometry of the external surface to determine the first placement of the first feature further includes mapping the first placement of the first feature onto a computer model of the component.

Forming the component with a second feature on an internal surface, measuring a geometry of the internal surface to determine a second placement of the second feature, and drilling the cooling hole through the component from the first placement to the second placement.

The measurement of the geometry of the internal surface is performed using flash thermography and an infrared camera.

The step of measuring the geometry of the internal surface to determine the second placement of the second feature further includes introducing thermal energy to the internal surface of the component, and measuring the change in temperature along the external surface as the component cools in response to the thermal energy to determine the second placement.

The step of measuring the geometry of the internal surface to determine the second placement of the second feature further includes determining the second placement using an algorithm dependent upon a first temperature versus time response curve for a given wall thickness and material as compared to a second temperature versus time response curve for a different wall thickness of the component in response to the introduction of thermal energy.

The step of measuring the geometry of the internal surface to determine the second placement of the second feature further includes mapping the second placement of the second feature onto a computer model of the component.

The step of forming the component with the second feature on the internal surface further includes forming the second feature having an indentation.

The step forming the component with the first feature on the external surface further includes forming the first feature having multiple lobes.

Drilling the film cooling hole through the component at the first placement is performed using a laser.

Drilling the film cooling hole through the component at the first placement is performed using electric discharge machining.

Another method of forming a hole is a component with improved accuracy includes casting the component with the component having at least one external feature on an external surface, determining a first placement of the at least one external feature, and forming the hole through the component at the first placement. The external feature can be an indentation with the first placement being at a location of maximum depth of the external feature such that a hole is formed with a complex geometry adjacent the external surface.

The method of forming a hole of the preceding paragraph can optionally include, additionally and/or alternatively, any one or more of the following features, configurations, steps, and/or additional components:

The at least one external feature is an indentation.

The step of determining a first placement of the at least one external feature is performed by a structured light scanner.

Mapping the first placement onto a computer model of the component.

The step of casting the component with the component having at least one external feature on the external surface further includes casting the component with the component having at least one internal feature on an internal surface, and the method further includes determining a second placement of the at least one internal feature and forming the hole through the component with the hold extending between the first placement and the second placement.

The step of determining a second placement of the at least one internal feature is performed using thermography with a thermal imaging camera.

Mapping the second placement onto a computer model of the component.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a film cooling hole in a component having an internal surface and an external surface, the method comprising:
forming the component with a first feature on the external surface and a second feature on an internal surface, the first feature being an indentation;
measuring a geometry of the external surface to determine a first placement of the first feature with the first placement being at a location of maximum depth of the first feature;
introducing thermal energy to the internal surface of the component;
measuring a change in temperature along the external surface as the component cools in response to the thermal energy to determine a second placement of the second feature using an algorithm that includes comparing a first temperature versus time response curve for a given wall thickness and material to a second temperature versus time response curve for a different wall thickness of the component in response to the introduction of thermal energy; and
drilling the film cooling hole through the component at the first placement to the second placement.

2. The method of claim 1, wherein the measurement of the geometry of the external surface is performed using a structured light scanner.

3. The method of claim 1, wherein the step of measuring the geometry of the external surface to determine the first placement of the first feature further comprises:
mapping the first placement of the first feature onto a computer model of the component.

4. The method of claim 1, wherein the measurement of the change in temperature along the external surface to determine the second placement is performed using flash thermography and an infrared camera.

5. The method of claim 1, wherein the step of measuring the change in temperature along the external surface to determine the second placement of the second feature further comprises:
mapping the second placement of the second feature onto a computer model of the component.

6. The method of claim 1, wherein the step of forming the component with the second feature on the internal surface further comprises:
forming the second feature having an indentation.

7. The method of claim 1, wherein the step forming the component with the first feature on the external surface further comprises:
forming the first feature having multiple lobes.

8. The method of claim 1, wherein drilling the film cooling hole through the component at the first placement is performed using a laser.

9. The method of claim 1, wherein drilling the film cooling hole through the component at the first placement is performed using electric discharge machining.

10. A method of forming a hole in a component with improved accuracy, the method comprising:
casting the component with the component having at least one external feature on an external surface with the at least one external feature being a first indentation;
determining a first placement of the first indentation;
casting the component with the component having at least one internal feature on an internal surface with the at least one internal feature being a second indentation;
determining a second placement of the second indentation by introducing thermal energy to the internal surface of the component and measuring a change in temperature along the external surface as the component cools in response to the thermal energy to determine a second placement of the second feature using an algorithm that includes comparing a first temperature versus time response curve for a given wall thickness and material to a second temperature versus time response curve for a different wall thickness of the component in response to the introduction of thermal energy; and
forming the hole through the component with the hole extending between the first placement and the second placement.

11. The method of claim 10, wherein the step of determining a first placement of the at least one external feature is performed by a structured light scanner.

12. The method of claim 10, further comprising:
    mapping the first placement onto a computer model of the component.

13. The method of claim 10, wherein the step of determining a second placement of the at least one internal feature is performed using thermography with a thermal imaging camera.

14. The method of claim 10, further comprising:
    mapping the second placement onto a computer model of the component.

* * * * *